United States Patent Office 3,020,314
Patented Feb. 6, 1962

3,020,314
PROCESS FOR THE PREPARATION OF ALCOHOLS, ALDEHYDES AND KETONES
Thomas Alderson, Wilmington, Del., assignor to E. I. du Pont de Nemours and Company, Wilmington, Del., a corporation of Delaware
No Drawing. Filed Oct. 22, 1959, Ser. No. 847,889
10 Claims. (Cl. 260—597)

This invention relates to a process for preparing oxygenated organic compounds, such as aliphatic alcohols, aldehydes and ketones, and is more particularly concerned with an improved catalytic process for reacting olefins with carbon monoxide and water to prepare alcohols and other oxygenated compounds. This application is a continuation-in-part of my copending application, Serial No. 712,309, filed January 31, 1958, now abandoned.

The reaction of olefins with carbon monoxide and hydrogen to form mixtures of aldehydes and ketones has been the subject of extensive investigations. The type of product as well as the product distribution in this reaction is markedly affected by the process conditions and catalyst used. For example, in the presence of zinc chromate at 300° C. and 150 to 250 atmospheres the product consists primarily of methanol and hydrocarbons with aldehydes and higher alcohols present in very small amounts. If the pressure is reduced to atmospheric, the temperature reduced to 206 to 245° C., and if the catalyst is a cobalt-copper-manganese oxide mixture, the product obtained is then methanol-free. Increasing the temperature to 500° C. and the pressure to 150 atmospheres results in the formation of hydrocarbons, higher alcohols, and ketones. Using a substantial excess of hydrogen, a hydrogenation catalyst, temperatures of 75° to 200° C., and pressures of 325 to 1000 atmospheres the reaction is selectively directed to propionaldehyde formation. In all of these prior methods hydrogen has been an essential initial reactant.

It is an object of this invention to provide an efficient and economical method for synthesizing such oxygenated organic compounds which avoids the use of hydrogen in the initial charge. A further object is to provide an improved process for preparing aliphatic alcohols from carbon monoxide and an olefin of at least three carbon atoms in the presence of water as the hydrogen donor. Other objects will become apparent from the specification and claims.

In accordance with this invention, oxygenated organic compounds of the class consisting of alcohols, aldehydes and ketones are synthesized by reacting carbon monoxide, an olefin containing at least three carbon atoms and water, at a temperature of at least 100° C. and a pressure of at least 100 atmospheres, in the presence of a catalytic amount of a halide of a noble metal of group VIII of the periodic table, i.e., Ru, Rh, Pd, Os, Ir or Pt. This catalyst is used either alone or in combination with up to 10 moles/mole of said halide of an organic derivative of an element of group V having an atomic number of 7 to 83, i.e., N, P, As, Sb or Bi.

The periodic table referred to herein is that set forth in Deming's "General Chemistry," John Wiley and Sons, Inc., 5th ed., chapter 11.

In one embodiment, a reactor is charged with water and catalyst, cooled, evacuated, olefin is added, and carbon monoxide is then injected so that at reaction temperature the pressure is at least 100 atmospheres. The charge is maintained at reaction temperature and pressure until reaction is complete, as evidenced by cessation of pressure drop. Thereafter, the reaction mixture is allowed to cool, the reactor is opened, and the contents discharged. The desired reaction products are isolated by distillation or other methods known to those skilled in the art.

In the process of this invention there can be used any olefin of at least three carbon atoms. Illustrative of such olefins are propylene, butylenes, octenes, decaoctenes, 1,3-butadiene, 2-methyl-1,3-butadiene, 2,3-dimethyl-1,3-butadiene, cyclohexene, methylcyclohexene, styrene, methyl styrene, vinylcyclohexene, 3,3-dimethyl-1-butene, 2,4-hexadiene, 2-methyl-1,4-hexadiene, 2-phenylbutene, 2-cyclohexylbutene, and the like. Acyclic olefins of 4 to 6 carbon atoms are preferred.

The initial molar ratio of olefin:carbon monoxide:water can vary from 1:0.1:0.1 to 1:5:15. However, the molar ratio of olefin:carbon monoxide:water from 2:2:1 to 1:1:15 favors the production of ketones, 2:2:1 to 1:0.1:15 favors the production of alcohols, and 2:2:1 to 1:5:15 favors the production of aldehydes.

It is to be understood that any chloride, bromide or iodide of a noble metal of group VIII can be used. Suitable are ruthenium dichloride, ruthenium tetrachloride, ruthenium triiodide, rhodium trichloride, platinum dichloride, platinum tetrachloride, platinum tetraiodide, palladium dibromide, osmium dichloride, osmium trichloride, iridium tetrachloride, iridium tetrabromide, iridium triiodide, and the hydrates of these halides. The chlorides and bromides of rhodium, palladium and iridium are preferred for the production of aliphatic alcohols from acyclic olefins.

The organic derivatives of the group V elements of atomic number 7 to 83 are pyridine and quinoline and compounds represented by the general formula

in which M is the group V element and R, R', and R" are members of the group consisting of hydrogen, alkyl and monocyclic aryl hydrocarbon radicals of up to 18 carbons.

The catalyst consists of the group VIII noble metal halide either alone or in admixture with the organic derivative of group V element and the mole ratio of the latter to the former in the composition can vary over a wide range up to 10:1. Good results are obtained with approximately 3 moles of the group V derivative/mole of noble metal halide and this is the proportion which is generally used. Mixtures of pyridine with chlorides of ruthenium, rhodium, palladium or iridium are preferred for the production of aliphatic alcohols from acyclic olefins.

The amount of catalyst, i.e., the halide of noble metal of group VIII alone or in combination with organic derivative of group V element, ranges from 0.00001 to 0.1 mole per mole of olefin charged into the reactor.

As already indicated, the reaction of the olefin, carbon monoxide, and water is conducted in the presence of the aforesaid catalysts at temperatures which are at least 100° C. and pressures which are in excess of 100 atmospheres. Generally there is no practical merit in using temperatures and pressures above 350° C. and 3000 atmospheres and these represent practical operating upper temperature and pressure limits. Since outstanding results are realized using temperatures of 150° to 300° C. and pressures of 500 to 2500 atmospheres, these embrace the conditions most generally employed.

It will be understood that the invention can be practiced by heating the reactants batchwise, semicontinuously, or continuously in any suitable pressure-resistant vessel, e.g., an autoclave or in a tubular converter, preferably lined with an inert material. In a continuous process the reactants may be introduced at one or more points within the reaction vessel. In certain instances, it is better to employ a tubular reactor in which temperature and pressure are not uniform throughout the length of the vessel.

The examples which follow are submitted to illustrate and not to limit this invention. Unless otherwise stated, parts are by weight and the group VIII noble metal halides used are the commercially available materials.

Example 1

A pressure reactor is charged with 100 parts of water, 1.0456 parts of rhodium chloride, and 1.5 parts of pyridine. The reactor is cooled and evacuated and 168 parts of propylene are distilled in. The system is then pressured with carbon monoxide and the reactants are heated at 214° C. and 980 atm. During a 10-hour reaction period the observed pressure drop amounts to 170 atm. From this reaction there are recovered 71.5 parts of propylene and 155 parts of products.

These products are distilled through a 12-inch distilling column and boiled over the range 20–45° C./3 mm. The distillate is saturated with calcium chloride and the organic phase is separated. The calcium chloride-water phase is extracted with diethyl ether and the ether extract is added to the original organic phase. The ether solution is dried over anhydrous magnesium sulfate and fractionally distilled. From this distillation there is isolated 75 parts of isopropyl alcohol-water azeotrope (containing 80.38% isopropyl alcohol), B.P. 80° C., $n_D^{25}=1.3754$. The isopropyl alcohol in the azeotrope is readily identified by infrared analysis.

Example 2

A pressure reactor is charged with 100 parts of water, 0.65 part of ruthenium tribromide and 0.6 part of pyridine. The reactor is cooled, evacuated, and 168 parts of propylene are distilled in. The reactor is then pressured with carbon monoxide and the reactants are shaken at 230° C. and 960 atm. for 10 hours. A pressure drop of 210 atm. is observed during the heating period. There are recovered 130 parts of propylene and 123 parts of clear tan two-phase liquid which is distilled through a 12-inch distilling column, to yield 120 parts of liquid.

The distillate is saturated with calcium chloride and 35 parts of organic phase, $n_D^{25}=1.3860$ are separated, dried over anhydrous magnesium sulfate, and fractionally distilled. From this distillation there is obtained 7 parts of isopropyl alcohol-water azeotrope, B.P. 78–79° C., $n_D^{25}=1.3761$, and 7 parts of isobutyraldehyde. The 2,4-dinitrophenylhydrazone of this aldehyde melts at 170–172° C. There is also obtained 2 parts of isobutyric acid, readily identified by infrared analysis.

Example 3

A pressure reactor is charged with 100 parts of water, one part of iridium trichloride trihydrate, and 1.5 parts of pyridine. The reactor is cooled, evacuated, and 168 parts of propylene are distilled in. The reactor is then pressured with carbon monoxide and heated at 248° C. and 1000 atm. pressure for 10 hours. A pressure drop of 60 atm. is observed during the heating period. There are recovered 126 parts of propylene and 121 parts of two-phase product, which is distilled through a 12-inch distilling column to yield 117 parts of distillate. The distillate is saturated with calcium chloride and extracted four times with 7 parts of carbon tetrachloride. The extract is dried over anhydrous magnesium sulfate and fractionally distilled. From this distillation there is obtained 25 parts of isopropyl alcohol-water azeotrope, B.P. 80° C., $n_D^{25}=1.3760$.

Example 4

A pressure reactor is charged with 100 parts of water, 2 parts of a one molar solution of palladous chloride in 12 N hydrochloric acid, and 5 parts of pyridine. The reactor is cooled, evacuated, and 168 parts of propylene are distilled in. The reactor is then pressured with carbon monoxide and the reactants are shaken at 221° C. and 950 atm. for 10 hours. A pressure drop of 275 atm. is observed during the heating period. There are recovered 81 parts of propylene and 141 parts of reaction product.

The reaction product is distilled through a 12-inch distilling column to yield 133.5 parts of distillate, B.P. 25–52° C./3 mm. The distillate is saturated with calcium chloride and extracted with diethyl ether. The organic phase and ether extract are combined, dried over anhydrous magnesium sulfate, and fractionally distilled. From this distillation there is obtained 70 parts of isopropyl alcohol-water azeotrope, B.P. 80° C., $n_D^{25}=1.3754$. The isopropyl alcohol is readily identified by infrared analysis.

Example 5

A pressure reactor is charged with 100 parts of water and one part of rhodium trichloride trihydrate. The reactor is cooled, evacuated, and 168 parts of propylene are distilled in. The reactor is pressured with carbon monoxide and the reactants are shaken at 209° C. and 700–925 atm. for 10 hours. A pressure drop of 335 atm. is observed during the heating period. There are recovered 70 parts of propylene and 178 parts of light brown liquid product.

The liquid product is distilled through a 12-inch distilling column at 3 mm. pressure to yield 176 parts of two-phase distillate. The organic phase amounts to 108 parts, $n_D^{25}=1.3765$. The aqueous phase is extracted with diethyl ether; the extract is combined with the organic phase and dried over anhydrous magnesium sulfate. The dried product is fractionally distilled to yield 40 parts of acetone, B.P. 56° C., $n_D^{25}=1.3578$, the 2,4-dinitrophenylhydrazone of which has the M.P. 126° C., and 16 parts of isopropyl alcohol-water azeotrope, B.P. 80° C., $n_D^{25}=1.3775$. The isopropyl alcohol is readily identified by infrared analysis. There is also obtained some higher boiling carbonyl-containing products, as revealed by infrared analysis.

Example 6

A pressure reactor is charged with 100 parts of water and one part of iridium trichloride trihydrate. The reactor is then cooled, evacuated, and 168 parts of propylene are distilled in. Carbon monoxide is injected so that at 230–249° C. the pressure is 840–1000 atm. These conditions are maintained for 10 hours, during which time a pressure drop in excess of 110 atm. is observed. There are obtained 81 parts of propylene and 145 parts of product.

Distillation of the product through a 12-inch column at 3 mm. pressure gives 142 parts of condensate. The condensate is saturated with calcium chloride and 89 parts of organic phase are separated and fractionally distilled to yield 37 parts of isopropyl alcohol-water azeotrope, B.P. 80° C., $n_D^{25}=1.3753$. The isopropyl alcohol is readily identified by infrared analysis. There is also obtained 9 parts of acetone.

Example 7

A pressure reactor is charged with 100 parts of water and 0.5 part of rhodium trichloride trihydrate. The reactor is cooled, evacuated, and then charged with 168 parts of propylene. The reactor is pressured with carbon monoxide so that at 193°–210° C. the pressure is 600–700 atm. These conditions are maintained for 10 hours. A pressure drop in excess of 275 atm. is observed during this period. There are recovered 53 parts of propylene and 188 parts of clear red-brown liquid, which is distilled at 3 mm. pressure to yield 174 parts of distillate.

The distillate is saturated with sodium chloride and 151 parts of organic phase are separated. The water is extracted with diethyl ether and the extract is combined with the initial organic phase. The ether solution is dried over anhydrous magnesium sulfate and then fractionally distilled. There are obtained 36 parts of isobutyraldehyde (B.P. 64° C., $n_D^{25}$=1.3722, M.P. 180–181° C. as isobutyraldehyde 2,4-dinitrophenylhydrazone) and 45 parts of isopropyl alcohol-water azeotrope (B.P. 80° C., $n_D^{25}$=1.3757). The isopropyl alcohol is readily identified by infrared analysis. Other oxygenated products obtained are 5 parts of diisopropyl ketone, the 2,4-dinitrophenylhydrazone of which melts at 84–85° C., and a small amount of isobutyric acid.

*Example 8*

A pressure reactor is charged with 100 parts of water and two parts of a one molar solution of palladous chloride in 12 N hydrochloric acid. The reactor is cooled, evacuated, and then charged with 168 parts of propylene. The reactor is pressured with carbon monoxide so that at 208° C. the pressure is 660–960 atm. These conditions are maintained with agitation for 10 hours. A pressure drop of 360 atm. occurs during this period. There are recovered 42 parts of propylene and 208 parts of clear light yellow liquid products.

The yellow liquid is distilled at 10 mm. pressure to yield 190 parts of distillate, which is saturated with sodium chloride. A small water layer is separated, which is extracted with diethyl ether. The ether extract is combined with the organic phase, dried over anhydrous magnesium sulfate, and fractionally distilled. There is obtained 44 parts of isobutyraldehyde (identifiable as the 2,4-dinitrophenylhydrazone, M.P. 179–180° C.).

There is also obtained 90 parts of isopropyl alcohol, B.P. 82° C., $n_D^{25}$=1.3760. The identity of the product as isopropyl alcohol is readily confirmed by infrared analysis.

*Example 9*

A pressure reactor is charged with 100 parts of water, 0.8 part of ruthenium trichloride trihydrate, and 4.5 parts of di-n-propylamine. The reactor is cooled, evacuated, and charged with 168 parts of propylene. Carbon monoxide is then added so that at 220° C. the pressure is 990 atmospheres. These conditions are maintained with agitation for 10 hours, during which time a pressure drop of 140 atm. is observed. The reaction of propylene produces 127 parts of clear orange two-phase product, which is distilled through a 12-inch distilling column. The mixture of oxygenated organic compounds and water boiling at 45° C./5 mm. is collected, the distillate saturated with sodium chloride, the organic phase separated, and the aqueous phase extracted with diethyl ether. The extract is combined with the organic phase, dried over anhydrous magnesium sulfate, and fractionally distilled. There are obtained 20 parts of acetone (B.P. 54° C., $n_D^{25}$=1.3558, M.P. of acetone 2,4-dinitrophenylhydrazone, 127–128° C.), and 16 parts of isobutyric acid (B.P. 100° C./102 mm.; $n_D^{25}$=1.3901, identifiable by infrared analysis).

*Example 10*

A pressure reactor is charged with 100 parts of water, 0.8 part of ruthenium trichloride trihydrate and 1.3 parts of dimethylphenylphosphine. The reactor is cooled, evacuated, and charged with 168 parts of propylene. Carbon monoxide is then added so that at 220° C. the pressure is 990 atmospheres. These conditions are maintained with agitation for 10 hours. The products from this reaction of propylene are treated as in Example 9 to recover the corresponding oxygenated organic compounds.

*Example 11*

A pressure reactor is charged with 100 parts of water, 0.8 part of ruthenium trichloride trihydrate and 1.7 parts of dicyclohexylamine. The reactor is cooled, evacuated, and charged with 168 parts of propylene. Carbon monoxide is then added so that at 220° C. the pressure is 990 atmospheres. These conditions are maintained with agitation for 10 hours. The products from this reaction of propylene are treated as in Example 9 to recover the corresponding oxygenated organic compounds.

*Example 12*

A pressure reactor is charged with 100 parts of water, 0.8 part of ruthenium trichloride trihydrate and 2.1 parts of platinum tetraiodide and 1.1 parts of phenyldimethylamine. The reactor is cooled, evacuated, and charged with 168 parts of propylene. Carbon monoxide is then added so that at 220° C. the pressure is 990 atmospheres. These conditions are maintained with agitation for 10 hours. The products from this reaction of propylene are treated as in Example 9 to recover the corresponding oxygenated organic compounds.

*Example 13*

A pressure reactor is charged with 100 parts of water, 0.8 part of ruthenium trichloride trihydrate and 3.4 parts of tricyclohexylstibine. The reactor is cooled, evacuated, and charged with 168 parts of propylene. Carbon monoxide is then added so that at 220° C. the pressure is 990 atmospheres. These conditions are maintained with agitation for 10 hours. The products from this reaction of propylene are treated as in Example 9 to recover the corresponding oxygenated organic compounds.

*Example 14*

A pressure reactor is charged with 100 parts of water, 0.8 part of ruthenium trichloride trihydrate and 2.0 parts of methylphenylstibine. The reactor is cooled, evacuated, and charged with 168 parts of propylene. Carbon monoxide is then added so that at 220° C. the pressure is 990 atmospheres. These conditions are maintained with agitation for 10 hours. The products from this reaction of propylene are treated as in Example 9 to recover the corresponding oxygenated organic compounds.

*Example 15*

A pressure reactor is charged with 100 parts of water, 0.8 part of ruthenium trichloride trihydrate and 2.2 parts of phenyltolylarsine. The reactor is cooled, evacuated, and charged with 168 parts of propylene. Carbon monoxide is then added so that at 220° C. the pressure is 990 atmospheres. These conditions are maintained with agitation for 10 hours. The products from this reaction of propylene are treated as in Example 9 to recover the corresponding oxygenated organic compounds.

*Example 16*

A pressure reactor is charged with 100 parts of water, 0.8 part of ruthenium trichloride trihydrate and 0.8 part of osmium dichloride and 4.0 parts of triphenylbismuthine. The reactor is cooled, evacuated, and charged with 168 parts of propylene. Carbon monoxide is then added so that at 220° C. the pressure is 990 atmospheres. These conditions are maintained with agitation for 10 hours. The products from this reaction of propylene are treated as in Example 9 to recover the corresponding oxygenated organic compounds.

*Example 17*

A pressure reactor is charged with 100 parts of water, 0.8 part of ruthenium trichloride trihydrate and 4.1 parts of dioctylmethylbismuthine. The reactor is cooled, evacuated, and charged with 168 parts of propylene. Carbon monoxide is then added so that at 220° C. the pressure is 990 atmospheres. These conditions are maintained with agitation for 10 hours. The products from this reaction of propylene are treated as in Example 9 to recover the corresponding oxygenated organic compounds.

*Example 18*

A pressure reactor is charged with 100 parts of water, 0.8 part of ruthenium trichloride trihydrate and 2.9 parts of octadecyldimethylphosphine. The reactor is cooled, evacuated, and charged with 168 parts of propylene. Carbon monoxide is then added so that at 220° C. the pressure is 990 atmospheres. These conditions are maintained with agitation for 10 hours. The products from this reaction of propylene are treated as in Example 9 to recover the corresponding oxygenated organic compounds.

*Example 19*

A pressure reactor is charged with 100 parts of water and 1.045 parts of rhodium trichloride trihydrate. The reactor is cooled, evacuated and 54 parts of butadiene added. The reactor is pressured with carbon monoxide to an operating pressure of 600–640 atmospheres at 175°–180° C. and maintained at 175°–180° C. with agitation for 16 hours, during which time a pressure drop of 410 atmospheres is observed. There is obtained 136 parts of a two-phase liquid which is separated into an aqueous phase and 62 parts of an organic phase by distillation. The aqueous phase is extracted with ether and the extract is added to the organic phase. This product is dried over anhydrous magnesium sulfate and fractionally distilled to give 43 parts of n-amyl alcohol, B.P. 48° C./4 mm., $n_D^{25}=1.4083$, identifiable by infrared analysis. There are also obtained 3 parts of a low-boiling ester, B.P. 34° C./56 mm. and 15 parts of an acetal, B.P. 63–70° C./3.5 mm., $n_D^{25}=1.4280$, identifiable as such by infrared analysis.

*Example 20*

A pressure reactor is charged with 100 parts of water, 0.7 part of rhodium trichloride trihydrate, 0.87 part of triphenylphosphine, and 1.6 parts of 12 N hydrochloric acid. The reactor is cooled, evacuated, and 54 parts of butadiene are distilled in. Carbon monoxide is added so that at 160–230° C. the pressure is from 500–750 atmospheres. These conditions are maintained with agitation for 10 hours. A pressure drop of 330 atmospheres is observed during this period. There are recovered 134 parts of two-phase liquid and 9 parts of polybutadiene. The liquid is distilled through a 12-inch distilling column to yield 106 parts of distillate, B.P. 20–168° C./2–3 mm. From the distillate there is separated 46 parts of a mixture of oxygenated organic compounds which is fractionally distilled to yield 14 parts of n-amyl alcohol, B.P. 77° C./68 mm., $n_D^{25}=1.4102$, identifiable as n-amyl alcohol by its infrared absorption spectrum, 24 parts of n-valeric acid, B.P. 112° C./68 mm., $n_D^{25}=1.4102$, and a mixture containing higher boiling acids and lactones, identifiable as such by infrared analysis.

*Example 21*

A pressure reactor is charged with 100 parts of water, 1.0 part of rhodium trichloride trihydrate, 1.8 parts of triphenylstibine and 2.5 parts of concentrated aqueous hydrochloric acid. The reactor is cooled, evacuated, and 80 parts of butadiene are added. Carbon monoxide is added so that at 160°–230° C. the pressure is from 500–750 atmospheres. These conditions are maintained with agitation for 10 hours. The products from this reaction of butadiene are treated as in Example 20 to recover the corresponding oxygenated organic compounds.

*Example 22*

A pressure reactor is charged with 100 parts of water, 1.045 parts of rhodium trichloride trihydrate, and 1.5 parts of pyridine. The reactor is cooled, evacuated, and 54 parts of butadiene are added. The system is then pressured with carbon monoxide so that at 200–210° C. the pressure is 600 atmospheres. These conditions are maintained for 10 hours with agitation. A pressure drop in excess of 260 atmospheres is observed during this period. There is recovered 117 parts of two-phase liquid which is distilled through a 12-inch column to yield 86 parts of two-phase distillate, B.P. 20–82° C./3 mm. The organic phase is separated, dried over anhydrous magnesium sulfate and fractionally distilled to yield 25 parts of n-amyl alcohol, B.P. 70° C./51 mm., $n_D^{25}=1.4098$, identifiable by infrared analysis.

*Example 23*

A pressure reactor is charged with 100 parts of water, 1.045 parts of rhodium trichloride trihydrate, and 2.5 parts of quinoline. The reactor is cooled, evacuated, and 54 parts of butadiene are added. The system is then pressured with carbon monoxide so that at 200–210° C. the pressure is 600 atmospheres. These conditions are maintained for 10 hours with agitation. The oxygenated organic product is recovered as in Example 22.

*Example 24*

A pressure reactor is charged with 100 parts of water, 0.8 part of rhodium trichloride trihydrate, and 1.5 parts of pyridine. The reactor is cooled, evacuated, 112 parts of isobutylene distilled in and the system pressured with carbon monoxide so that at 230° C. the pressure ranges from 900–1000 atmospheres. During a 10-hour reaction period there is an observed pressure drop of 705 atmospheres. There is recovered 177 parts of clear greenish two-phase liquid. On distillation the liquid yields 158 parts of distillate, B.P. 20–30° C./3–10 mm. The organic phase is separated, dried over anhydrous magnesium sulfate, and fractionally distilled to yield 70 parts of isoamyl alcohol, B.P. 74° C./70 mm., $n_D^{25}=1.4048$, identifiable by infrared analysis, and 25 parts of a $C_4$ carbonyl compound, B.P. 77–103° C., $n_D^{25}=1.3906$, which gives a 2,4-dinitrophenylhydrazone, M.P. 131–132° C. containing 22.42% nitrogen.

*Example 25*

A pressure reactor is charged with 50 parts of water and 1 part of rhodium trichloride trihydrate. The reactor is cooled, evacuated, 42 parts of propylene distilled in, and the system pressured with carbon monoxide to provide a propylene:carbon monoxide:water mole ratio of 1:0.08:2.8. The charge is heated at 162–185° C. and 1700 atmospheres pressure for 16 hours. During this period a pressure drop of 365 atmospheres is observed. There are recovered 74 parts of two-phase products, from which there is isolated 40 parts of n-butyl alcohol, B.P. 115–118° C., $n_D^{25}=1.3979$, identifiable by infrared analysis, and 20 parts of carbonyl-containing compounds, identifiable as such by infrared analysis.

*Example 26*

A 500-ml. reactor is charged with 50 g. of 1,5-hexadiene, 129.7 parts of water, 2.95 parts of pyridine, and 1 part of ruthenium chloride, and the charge shaken with carbon monoxide at 150–200° and 800–945 atmospheres for 14 hours. The product is a two-phase liquid. The water layer is twice extracted with ether and the two ether extracts are added to the top layer, which is dried over magnesium sulfate and distilled to give a total of 36.9 parts. A fraction boiling at 110–118° C. (12.5 parts) is refractionated to give a central cut at 57–61° C./16 mm., which is presumably a heptenal.

*Analysis.*—Calcd. for $C_7H_{12}O$: C, 74.95; H, 10.78. Found: C, 76.32; H, 10.19.

Vapor phase chromatographic data on the crude fraction indicated that it contained 49 and 24%, respectively, of the principal components. The analytical sample contained 59 and 28%, respectively, of these components. From the crude fraction there was obtained 2,4-dinitrophenylhydrazones, one having a red color indicating unsaturation, M.P. 154–156° C.

*Analysis.*—Calcd. for $C_{13}H_{16}O_4N_4$: C, 53.42; H, 5.52; N, 19.17. Found: C, 54.05; H, 5.32; N, 19.89; 19.97.

The other hydrozone was yellow and melted at 90–95° C. The higher boiling fractions from the reaction mixture boiled from 77° C./21 mm. to 120° C./1.5 mm. and appeared to be $C_{13}$ or $C_{12}$ mono-oxygenated compounds.

*Example 27*

A 400 ml. reactor containing 50 parts of 1,5-hexadiene, 129.7 parts of water, 2.95 parts of pyridine, and 1 part of rhodium trichloride trihydrate is shaken with carbon monoxide at 250° C. and 950 atmospheres for 16 hours. The pressure drop is 225 atmospheres, mostly in the first three hours. The product consists of two layers. To the organic layer there is added three ether extracts of the water layer. The combined extracts are dried over magnesium sulfate and distilled to give a principal fraction (30.4 parts at 80–90° C./1.8 mm., $n_D^{25}=1.4230–1.4262$), which appears to be a mixture of heptanols in which 1-heptanol predominates. Refractionation of the product showed that it was quite homogeneous. A central cut, B.P. 43° C./1 mm., was submitted for analysis.

*Analysis.*—Calcd. for $C_7H_{16}O$: C, 62.35; H, 13.88. Found: C, 63.11; H, 14.16.

The infrared spectrum was consistent with the structure of 1-heptanol. Higher boiling fractions were collected at 56–130° C./0.5 mm. and weighed 5.4 parts. A central cut, B.P. 77° C./1 mm.; $n_D^{25}=1.482$, is a di-hexenyl ketone.

*Analysis.*—Calcd. for $C_{13}H_{22}O$: C, 80.35; H, 11.41. Found: C, 80.33; H, 10.59.

Infrared: 3.4 microns (satd. CH); 5.75 microns (ketone carbonyl); 6.0 microns (unstn.); 7.3 microns ($CH_3$).

*Example 28*

A 200-ml. reactor containing 35 parts of propylene, 34.92 parts of water, a trace of hydroquinone, and 0.5 part of rhodium trichloride trihydrate is shaken with carbon monoxide at 200° C. and 2800–3000 atmospheres for 14 hours. The pressure drop is 610 atmospheres, mostly in the first five hours. The product is filtered to remove a brown solid. The one-phase filtrate is washed with water, dried over magnesium sulfate and distilled to give a forerun containing mostly isopropyl alcohol and fractions at 102–113° C. (11.1 parts) and at 48° C./69 mm., 220° C./2 mm., totaling 21.2 parts. A fraction boiling at 57–67° C./57–69 mm. (2.2 parts) has physical properties similar to diisopropylketone.

The foregoing detailed description has been given for clearness of understanding only and no unnecessary limitations are to be understood therefrom. The invention is not limited to the exact details shown and described for obvious modifications will occur to those skilled in the art.

I claim:

1. The process for preparing oxygenated organic compounds of the class consisting of alcohols and aldehydes of 5–7 carbon atoms and ketones of 9–13 carbon atoms from acyclic olefins of 4–6 carbon atoms respectively, which comprises reacting one of said olefins with carbon monoxide and water at a temperature of 100–350° C. and a pressure of 100–3000 atmospheres in the presence of a catalyst consisting essentially of a group VIII noble metal halide, wherein the halide is selected from the class consisting of chloride, bromide and iodide, and up to 10 moles per mole of noble metal halide of a group V compound selected from the group consisting of pyridine, quinoline and compounds represented by the formula,

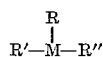

wherein M is a member of the group consisting of nitrogen, phosphorus, arsenic, antimony and bismuth, and R, R' and R" are members of the group consisting of hydrogen, and alkyl and monocyclic aryl hydrocarbon radicals of up to 18 carbon atoms, said halide being present in an amount ranging from 0.00001 to 0.1 mole per mole of olefin initially added for the reaction, and the initial molar ratio of olefin:carbon monoxide:water being within the range of 1:0.1:0.1 to 1:5:15.

2. The process of claim 1 wherein the initial molar ratio of olefin:carbon monoxide:water is from 2:2:1 to 1:1:15 and said group V compound is present in an amount of about 3 moles per mole of said halide.

3. The process of claim 1 wherein the initial molar ratio of olefin:carbon monoxide:water is from 2:2:1 to 1:0.1:15 and said group V compound is present in an amount of about 3 moles per mole of said halide.

4. The process of claim 1 wherein the initial molar ratio of olefin:carbon monoxide:water is from 2:2:1 to 1:5:15 and said group V compound is present in an amount of about 3 moles per mole of said halide.

5. A process of preparing oxygenated compounds of the class consisting of alcohols and aldehydes containing 5 carbon atoms and ketones containing 9 carbon atoms which comprises reacting butadiene with carbon monoxide and water at a temperature of 100° to 350° C. and a pressure of from 100–3000 atmospheres, in the presence of a catalyst consisting essentially of rhodium trichloride and about 3 moles per mole of said chloride of triphenylphosphine, said chloride being present in an amount of from 0.00001 to 0.1 mole per mole of butadiene initially added and the initial molar ratio of butadiene:carbon monoxide:water being within the range of from 1:0.1:0.1 to 1:5:15.

6. A process of preparing oxygenated compounds of the class consisting of alcohols and aldehydes containing 5 carbon atoms and ketones containing 9 carbon atoms which comprises reacting butadiene with carbon monoxide and water at a temperature of 100° to 350° C. and a pressure of from 100–3000 atmospheres, in the presence of a catalyst consisting essentially of rhodium trichloride and about 3 moles per mole of said chloride of triphenylstibine, said chloride being present in an amount of from 0.00001 to 0.1 mole per mole of butadiene initially added and the initial molar ratio of butadiene:carbon monoxide:water being within the range of from 1:0.1:0.1 to 1:5:15.

7. A process of preparing oxygenated compounds of the class consisting of alcohols and aldehydes containing 5 carbon atoms and ketones containing 9 carbon atoms which comprises reacting butadiene with carbon monoxide and water at a temperature of 100° to 350° C. and a pressure of from 100–3000 atmospheres, in the presence of a catalyst consisting essentially of rhodium trichloride and about 3 moles per mole of said chloride of pyridine, said chloride being present in an amount of from 0.00001 to 0.1 mole per mole of butadiene initially added and the initial molar ratio of butadiene:carbon monoxide:water being within the range of from 1:0.1:0.1 to 1:5:15.

8. A process of preparing oxygenated compounds of the class consisting of alcohols and aldehydes containing 5 carbon atoms and ketones containing 9 carbon atoms which comprises reacting butadiene with carbon monoxide and water at a temperature of 100° to 350° C. and a pressure of from 100–3000 atmospheres, in the presence of a catalyst consisting essentially of rhodium trichloride and about 3 moles per mole of said chloride of quinoline, said chloride being present in an amount of from 0.00001 to 0.1 mole per mole of butadiene initially added and the initial molar ratio of butadiene:carbon monoxide:water being within the range of from 1:0.1:0.1 to 1:5:15.

9. A process of preparing oxygenated compounds of the class consisting of alcohols and aldehydes containing 5 carbon atoms and ketones containing 9 carbon atoms which comprises reacting isobutylene with carbon monoxide and water at a temperature of 100° to 350° C. and a pressure of from 100–3000 atmospheres, in the presence of a catalyst consisting essentially of rhodium trichloride and about 3 moles per mole of said chloride of pyridine, said chloride being present in an amount of from 0.00001 to 0.1 mole per mole of isobutylene initially added and the initial molar ratio of isobutylene:carbon monoxide:water being within the range of from 1:0.1:0.1 to 1:5:15.

10. A process of preparing oxygenated compounds of the class consisting of alcohols and aldehydes containing 7 carbon atoms and ketones containing 13 carbon atoms which comprises reacting 1,5-hexadiene with water and carbon monoxide at a temperature of 100° to 350° C. and a pressure of from 100–3000 atmospheres, in the presence of a catalyst consisting essentially of rhodium trichloride and about 3 moles per mole of said chloride of pyridine, said chloride being present in an amount of from 0.00001 to 0.1 mole per mole of 1,5-hexadiene initially used, and the initial ratio of 1,5-hexadiene:carbon monoxide:water being in the range of from 1:0.1:0.1 to 1:5:15.

References Cited in the file of this patent

UNITED STATES PATENTS 2,593,440     Hagemeyer     Apr. 22, 1952